United States Patent [19]

Allsop et al.

[11] Patent Number: 5,415,423
[45] Date of Patent: May 16, 1995

[54] MODULAR COMPOSITE BICYCLE FRAME

[75] Inventors: James D. Allsop; Michael G. Allsop, both of Bellingham, Wash.

[73] Assignee: Softride, Inc., Bellingham, Wash.

[21] Appl. No.: 947,274

[22] Filed: Sep. 18, 1992

Related U.S. Application Data

[63] Continuation-in-part of Ser. No. 873,878, Apr. 22, 1992, Pat. No. 5,240,268, which is a continuation of Ser. No. 589,771, Sep. 28, 1990, abandoned, which is a continuation-in-part of Ser. No. 521,130, May 9, 1990, Pat. No. 5,029,888, which is a continuation of Ser. No. 333,891, Apr. 7, 1989, Pat. No. 4,934,724.

[51] Int. Cl.$^6$ ............................................. B62K 19/16
[52] U.S. Cl. ........................... 280/281.1; 280/288.2; D12/111; D12/119
[58] Field of Search .............. 280/281.1, 288.2, 288.3, 280/275; D12/111, 119

[56] References Cited

U.S. PATENT DOCUMENTS

| | | | |
|---|---|---|---|
| D. 45,219 | 2/1914 | Allen | 280/281.1 |
| 631,282 | 8/1899 | Dikeman | 280/281.1 |
| 1,580,414 | 4/1926 | Cozzolino et al. | 280/275 |
| 2,244,709 | 6/1941 | Kinzel | 280/281.1 |
| 2,493,037 | 1/1950 | Simon | 280/288.3 |
| 2,854,249 | 9/1958 | Jaulmes | 280/288.3 |
| 3,121,575 | 2/1964 | Bourgi | 280/236 |
| 4,613,146 | 9/1986 | Sharp et al. | 280/288.2 |
| 4,850,607 | 7/1989 | Trimble | 280/281.1 |
| 4,900,048 | 2/1990 | Derujinsky | 280/281.1 |
| 4,934,724 | 6/1990 | Allsop et al. | 280/281.1 |

FOREIGN PATENT DOCUMENTS

| | | | |
|---|---|---|---|
| 336181 | 4/1921 | Germany | 280/275 |
| 4101998 | 7/1992 | Germany | 280/288.2 |
| 286486 | 11/1990 | Japan | 280/288.3 |
| 352342 | 7/1931 | United Kingdom | 280/288.3 |

OTHER PUBLICATIONS

ZIPP 2001 Publication Dated 1991 per applicants.

Primary Examiner—Mitchell J. Hill
Attorney, Agent, or Firm—Christensen, O'Connor, Johnson & Kindness

[57] ABSTRACT

A bicycle (10) with a frame (12) formed out of composite material is disclosed. The frame of this bicycle includes a head unit or module (34) that is attached to two body units (36, 38). The head unit and body unit are formed out of a urethane core and can be formed of stiffened fiberglass, carbon fibers, or like nonmetallic material. The head unit and body units are formed with bores (78, 81, 83, 90) in which sleeves and cables are seated to accommodate the installation of the other components of the bicycle to the frame. The body is further formed with a set of rearwardly extending members that form the chain stays (22) of the bicycle. Dropouts (104) are seated in recesses formed in the chain stays. The bicycle includes a front derailleur/rear brake assembly (30) with a front derailleur (134) that can be both selectively moved up and down and selectively pivoted along a lateral axis of the bicycle. By selecting an appropriately sized head unit, the frame of the bicycle can built to a specific size. Components of specific dimension can then be attached to the frame to facilitate the construction of a bicycle of this invention so that it is built for a cyclist of a specific size.

27 Claims, 8 Drawing Sheets

Fig. 4.
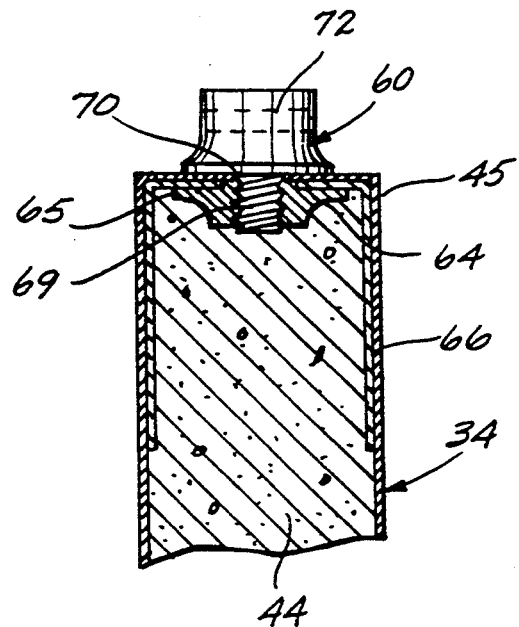
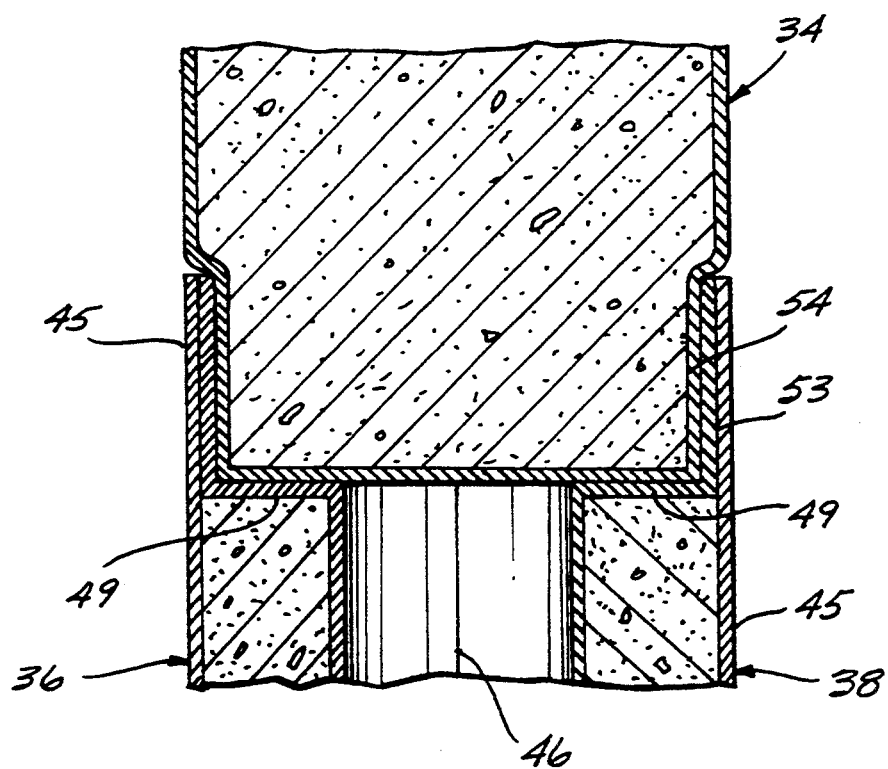
Fig. 14.

MODULAR COMPOSITE BICYCLE FRAME

RELATIONSHIP TO OTHER APPLICATIONS

This application is a continuation-in-part of application Ser. No. 07/873,878 filed April 22, 1992, now U.S. Pat. No. 5,240,268. That application is a continuation of application Ser. No. 07/589,771 filed Sep. 28, 1990, now abandoned. That application was a continuation-in-pan of application Ser. No. 07/521,130 filed May 9, 1990, now U.S. Pat. No. 5,029,888. That application was a continuation of application Ser. No. 07/333,891 filed Apr. 7, 1989, now U.S. Pat. No. 4,934,724.

FIELD OF THE INVENTION

This invention relates generally to bicycles and, more particularly, to a bicycle with a modular composite frame that can be readily constructed for cyclists of different sizes and statures.

BACKGROUND OF THE INVENTION

Bicycles have proven to be very efficient vehicles for converting human energy into mechanical energy in order to produce self-propelled motion. Most bicycles include a metallic frame that comprises a set of tubes that are welded together. The wheels, the drive assembly, and the steering assembly are all mounted to the frame to complete the bicycle. Recently, there have been significant efforts to substitute frames formed out of composite material for frames formed out of metal. An advantage of a composite frame is that it offers as much structural strength as a metal frame and weighs significantly less. Moreover, composite frames, unlike conventional frames, do not rust and corrode when exposed to the elements. These advantages are expected to help make composite-frame bicycles very popular for use as mountain bicycles and other types of bicycles where it is desirable to have a frame with significant mechanical strength and that can withstand the rigors of contact with water, mud, rocks, and other wearing material.

Composite bicycle frames are typically formed out of nonmetallic material that is shaped in a mold. Owing to the expenses associated with forming the molds, it has proven very expensive to provide the differently sized composite frames required to build bicycles for large numbers of cyclists who are themselves of different statures. Moreover, in order to satisfy the bicycling population's demand for differently sized bicycles, the retailer, the distributor, an&or the manufacturer are forced to have a large number of already assembled frames in inventory. At a minimum, this requires a large amount of storage space and at worst may require those involved in the manufacturing and sale of bicycles to tie up large amounts of capitol in inventory for which there may seldom be a need. Some bicycle manufactures have attempted to overcome this problem by providing composite frames with metal fittings and fixtures that can be adjustably set to accommodate the needs of differently sized cyclists. However, this solution has not proven to be wholly satisfactory. The addition of these metal components increases the weight of the assembled bicycle so as to detract from the advantages of the composite frame.

SUMMARY OF THE INVENTION

This invention relates to a bicycle with a composite frame that can readily be dimensioned for use by a cyclist of a particular size and shape. The bicycle of this invention includes a composite frame that is formed out of a number of different units or modules that are mated together to form the whole frame. The bicycle includes a number of components, including composite body and head units, that are sized to form a frame that is custom shaped for a specific-sized cyclist.

The bicycle of this invention includes three composite units, two body units that are symmetric with respect to each other and a head unit that can be joined to the body units. In one version of the invention each body unit is formed with a urethane core and outer skin formed of a hardened material such as cured fiberglass or a stiffened graphite fiber weave. Each body unit is formed with one of the chain stays of the bicycle. When the body units are mated together, the adjoining skins form one or more centered upright ribs that extend lengthwise in the central vertical plane of the frame. The rear wheel of the bicycle is mounted to a pair of dropouts, each of which is removably secured in a recess formed in one of the chain stays. The head unit is seated in the top of the body units. Mounted in the head unit is a head tube to which the front fork and handlebar assemblies of the bicycle are attached. A shock-absorbing seat support is attached to the top of the head unit adjacent the head tube. The seat support extends rearward from the head unit and provides a beam to which a bicycle seat is attached over the rear wheel.

Once the body units of this bicycle are mated together, a head unit of a desired size is joined to the body units to provide the basic frame of the bicycle with a selected height. Specifically sized dropouts may be fitted to the chain stays of the body unit to accommodate the placement of a specifically sized wheel. The bicycle is also provided with a combined front derailleur/rear brake assembly that can be positioned for differently sized crank assemblies and differently sized wheels that may be mounted to the bicycle. The seat support allows the selective forward-and-rearward positioning of the seat. The adjustability of these components makes it possible to construct a bicycle formed from a genetic set of composite units or modules so that it is specifically shaped for the cyclist for which it is intended. Thus, the bicycle of this invention eliminates the need to maintain a large number of composite flames or to have to provide those flames with a large number of metal fixtures and fittings.

Still another feature of the bicycle of the invention is that, since it does not have either a top tube or a seat post tube, it is aerodynamically more efficient than other bicycles. While this bicycle is aerodynamically more efficient than other bicycles, since it is formed out of relatively strong composite materials, it is structurally as strong as, if not stronger than, other bicycles. The mechanical strength of this bicycle is enhanced by the fact that, when the body units are mated together, the inside skins of the units form one or more ribs that extend lengthwise of the frame.

BRIEF DESCRIPTION OF THE DRAWINGS

The invention will be pointed out with particularity in the appended claims. The above and further advantages of the invention may be better understood by reference to the following detailed description, taken in conjunction with the accompanying drawings, in which:

FIG. 4 is a partial sectional and cutaway view along cutting plane 4 indicated in FIG. 1, illustrating how the mounting stud is fixed to the center unit of the bicycle of this invention;

FIG. 14 (on the drawing sheet with FIG. 4) is a vertical section along cutting plane 14 indicated in FIG. 1, illustrating the joint between the head and body units of the frame of this invention.

DETAILED DESCRIPTION OF THE PREFERRED EMBODIMENT

Figure 1:
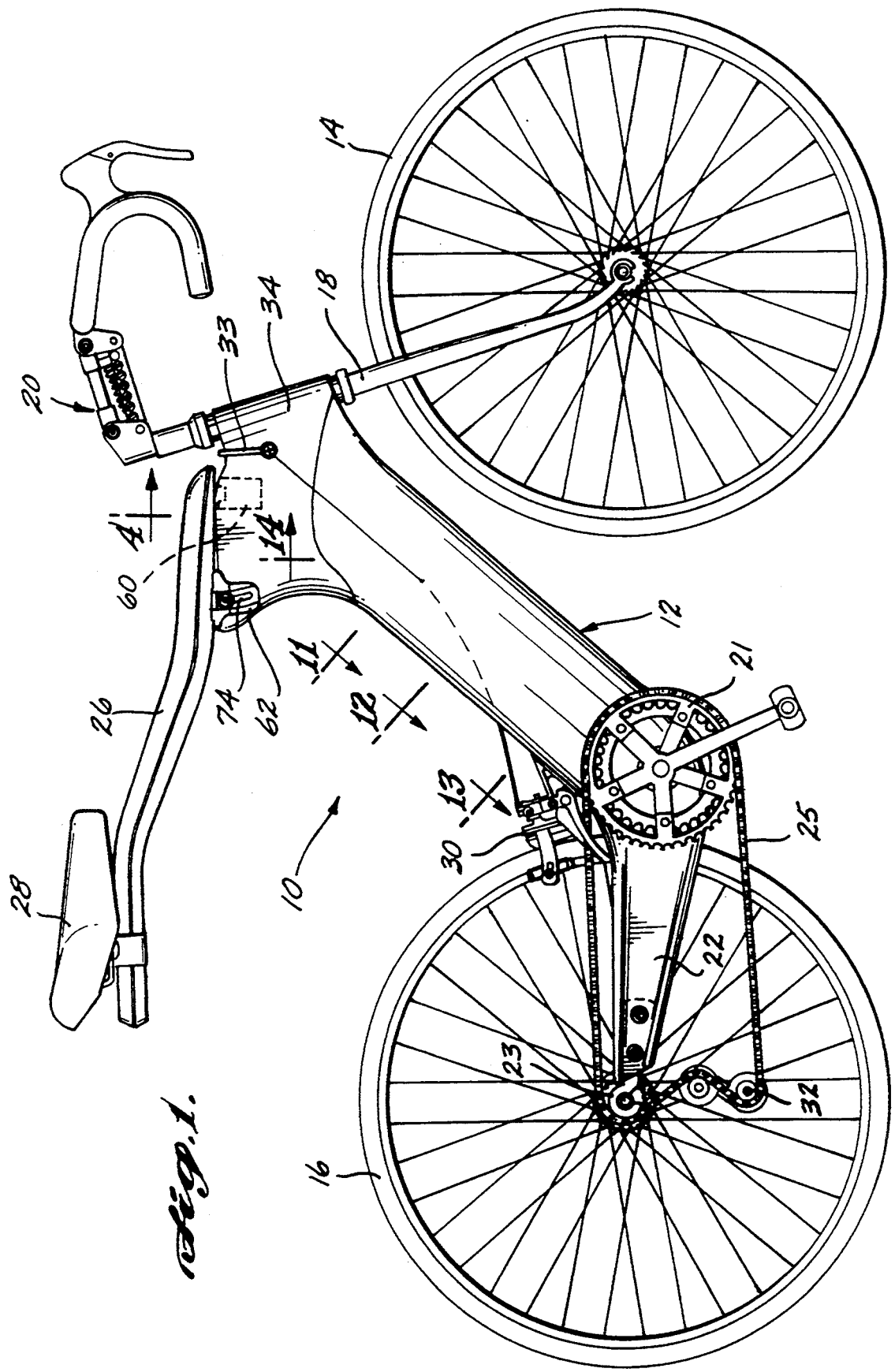
FIG. 1 is a side view of a bicycle having a frame in accordance with this invention.

FIG. 1 illustrates a bicycle 10 having a frame 12 in accordance with this invention. The bicycle frame 12 is formed out of composite material to which the front wheel 14 and rear wheel 16 are attached. The front wheel 14 is attached to the frame by a front fork assembly 18, which is rotatably carried by the frame. The orientation of the front fork assembly 18 and front wheel 14 is controlled by manipulation of a top handlebar assembly 20. The rear wheel 16 is attached to a pair of chain stays 22, which are pan of the frame 12. The rear wheel 16 is powered by a drive train that includes a crank assembly 21, which is rotatably mounted to the bottom of the frame 12, a free gear 23 that rotates with the rear wheel 16, and a chain 25 that connects the crank assembly to the free gear.

A shock-absorbing seat support 26 is attached to the top of the frame 12 adjacent and rearward of the handlebar assembly 20. The seat support 26 extends rearward and slightly upward from the top of the frame 12. A bicycle seat 28 is secured to the seat support 26 above the rear wheel 16. A combined front derailleur and rear brake assembly 30 is mounted to the frame 12 above the crank assembly 21. A rear derailleur 32 is attached to the rear wheel 16. The position of the derailleurs is established by a set of shifters 33 attached to the frame 12 adjacent the front fork assembly 18.

Figure 2:
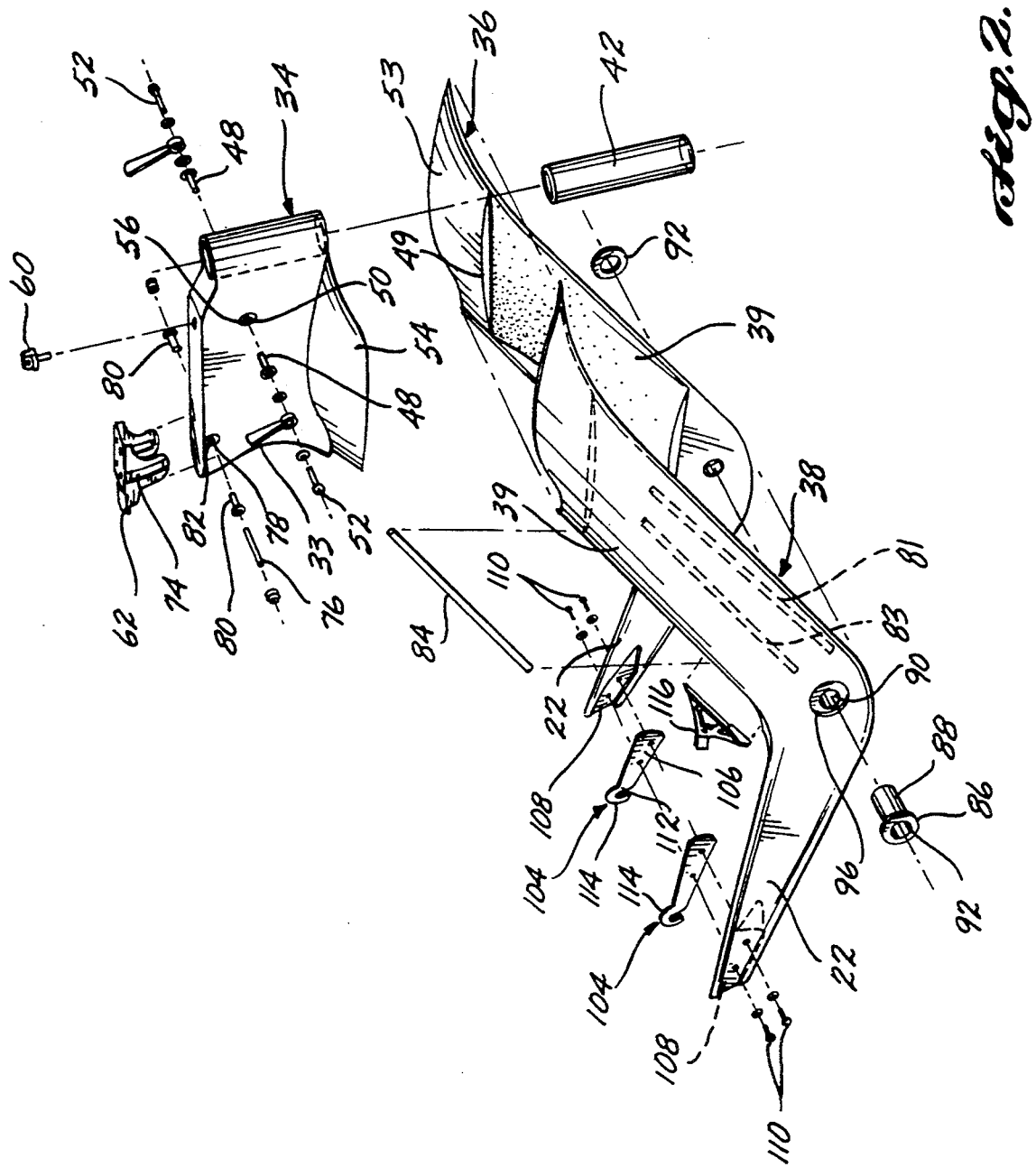
FIG. 2 is an exploded perspective of the frame of this invention.
Figure 3:
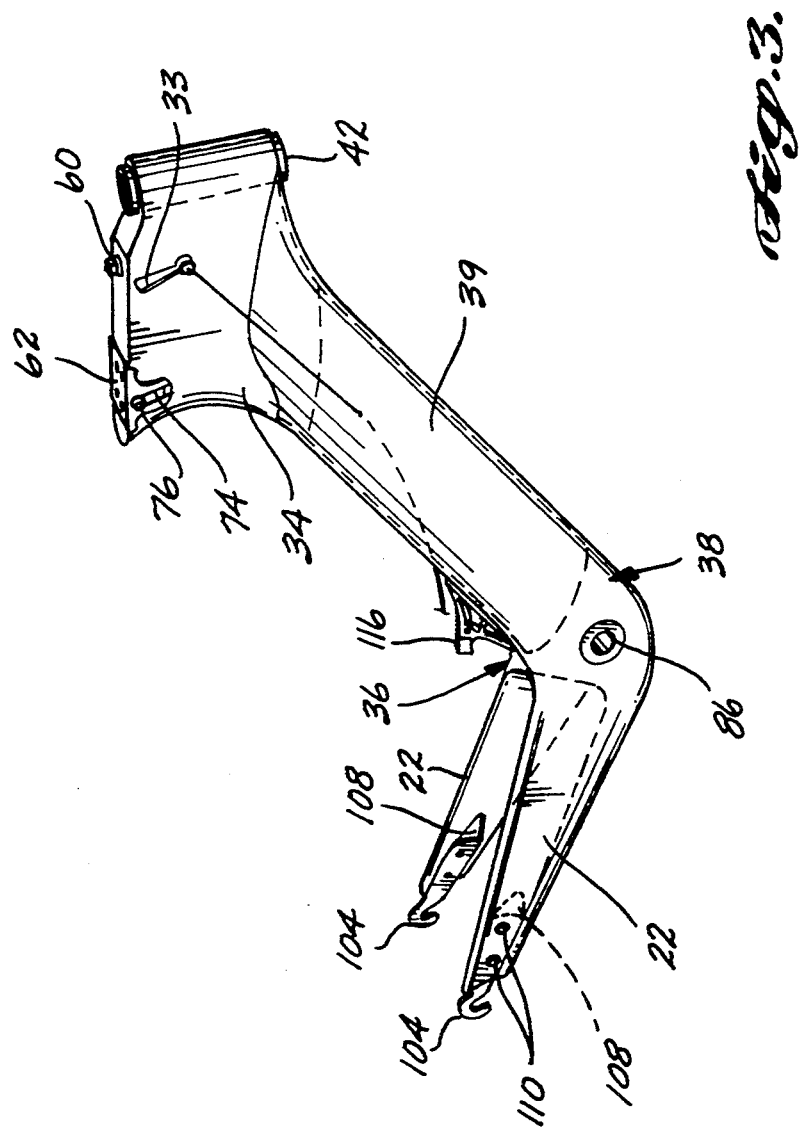
FIG. 3 is a perspective view corresponding to FIG. 2 but with parts assembled.

As depicted by FIGS. 2 and 3, the frame of the bicycle is actually formed out of three distinct units, a head unit 34, a left body unit 36, and a fight body unit 38. Each frame unit 34-38 is formed out of urethane foam core and a skin of fiberglass, carbon fiber, Kevlar, or other rigid, nonmetallic material that is resistant to corrosion. The body units 36 and 38 are each formed with a generally diagonally extending center section 39. Each body unit 36 and 38 is further formed with a bottom leg that extends horizontally from the associated center section and diverges rearward and outward from the bottom leg of the other body unit. The legs function as the chain stays 22 of the bicycle that support the rear wheel. The head unit 34 is disposed on top of the body units 36 and 38 and has a generally rectangular shape. As will be discussed hereinafter, the frame is assembled by initially mating body units 36 and 38 together and then seating the head unit 34 in the top or the body units.

The head unit 34 is provided with a head tube 42 in which the upper end, the quill, of the front fork assembly is journaled. The head tube 42 is dimensioned to extend out of the top and bottom of the head unit 34. In some preferred versions of the invention the head tube 42 is molded in place when the foam core of the head unit is formed. In other versions of the invention, after the foam core is formed, a bore is drilled and the head tube 42 is glue secured in position. In either version, when the outer skin is applied over the core, the skin is applied around the portions of the tube that extend out of the core. A handlebar assembly and, more particularly, a shock-absorbing clamp for a handlebar assembly that can be used to control the orientation of the front fork assembly and the front wheel are disclosed in PCT application No. PCT/US92/00781, which was published as WIPO Document No. WO 92/13749 on 20 Aug. 1992, and is incorporated herein by reference. The shifters 33 are secured to the head unit 34 adjacent and slightly rearward of the head tube 42 by a pair of sleeves 48. The sleeves 48 are secured in a bore 50 that extends longitudinally through the skin and core of the head unit. The adjacent ends of the sleeves 48 are provided with complementary threading or other fastening means so that they can be secured together. Threaded fasteners 52, which extend through the shifter components and are coupled into the sleeves 48, secure the shifters 33 to the head unit. The outer skin of the head unit is formed with recesses 56 adjacent the bore 50 in which the ranged outer ends of the sleeves as well as some of the shifter components are seated.

With reference to FIG. 1, the seat support 26 is in the form of an elevated beam that extends rearward from the top of the head unit 34 of the frame 12. One such seat support 26 that can be used with the bicycle 10 of this invention is disclosed in U.S. Pat. No. 4,934,724, which is owned by the assignee of this invention and incorporated herein by reference. The seat support 26 is attached to the head unit 34 by a forward mounting stud 60 and by a mounting bracket 62 located toward the rear of the head unit. As depicted by FIG. 4, the mounting stud 60 is held in position by a nut 64 and strap 66 located below the outer skin 45 of the head unit 34. The strap 66 is a three-sided structure and is formed of rigid metal approximately 25 mils. thick. The opposed upright legs of the strap are seated between the core 44 and outer skin 45 of the head unit. The nut 64 is seated underneath the top web of the strap 66. The nut 64 is formed with a top square-profiled flange 65 that is dimensioned to prevent 360° rotation of the nut. Mounting stud 60 has a threaded body 69 adapted to be inserted through a hole 70 formed in the center of the strap 66 and screwed into nut 64. A fin 72 extends upward from the body 69 of the stud 60. The fin 72 is formed with an opening designed to accommodate a fastening pin (not illustrated) used to secure the front portion of the seat support beam to the top of the head unit.

Mounting bracket 62, best seen in FIGS. 2 and 3, is a three-sided bracket, the center section of which is secured to the seat support beam. The opposed sides of the mounting bracket 62 extend over the opposite sides of the head unit 34. Each side of the bracket 62 is formed with a curved elongated slot 74. Mounting bracket 62 is locked into position, to establish the up-down angular orientation of seat support beam, by a fastener 76 that extends through the bracket slots 74 and the head unit 34. Specifically, the fastener 76 extends through a bore 78 formed in both the core and outer skin of the head unit 34. The fastener 76 is seated in a pair of sleeves 80 that are disposed in the bore 78. The outer skin of the head unit 34 adjacent bore 78 is formed with recesses 82 in which the flanges integral with the outer ends of the sleeves 80 and washers are seated.

Body units 36 and 38, as depicted by FIG. 2, in addition to serving as part of the structural frame of the bicycle, also define conduits for the cables that extend from the head unit to the derailleurs and the rear brake. Each body unit is formed with a first elongated bore 81, one shown, that extends from below the top of the body unit to the bottom of the body unit adjacent where the chain stay 22 is joined to the center section. Bores 81 function as the conduits through which the cables connecting the shifters to the derailleurs are housed. Right body unit 38 is further provided with a bore 83 that extends from below the top of the body unit to a point above the front derailleur and rear brake assembly. Bore 83 functions as the conduit in which the cable to the rear brake is housed. In some versions of the invention one, two, or all of the bores 81 and 83 may extend from the head unit 34 and into the body units 36 and 38. A sleeve 84 formed of rigid material may be seated in each of the bores 81 and 83 and serves as the actual conduit in which the cables therein are seated (one sleeve shown).

The bicycle crank assembly is coupled to a bottom bracket assembly 86 that is mounted in the bottom of the center sections 39 of body units 36 and 38. Bottom bracket assembly 86 includes a sleeve 88 that is seated in bore 90 that extends through the cores and outer skins of the body units 36 and 38. Sleeve 88 is held in position by a pair of lock tings 92 that are fitted around the exposed ends of the sleeve. The outer skins of the body units 36 and 38 are shaped to define recesses 96 around the ends of the bore 90 in which the lock rings 92 are seated. The individual cranks of the crank assembly are connected through the bottom bracket assembly 86 by a conventional spindle and bearing assembly (not illustrated).

The rear wheel and rear derailleur are mounted to the bicycle frame by a pair of dropouts 104 that are attached to the ends of the chain stays 22. Each dropout 104 includes a base unit 106 that is seated in a recess 108 formed in the outer skin of the inside face of the associated chain stay 22. Dropouts 104 are dimensioned to closely fit in the recesses 108 so that the horizontal surfaces of the chain stay that define the recesses provide the support needed to vertically lock the dropouts in place. Threaded fasteners 110 that extend through the base units 106 of the dropouts 104 and the chain stays 22 hold the dropouts in the recesses 108. A stem section 112 extends rearward from each dropout base unit 106. Each dropout is further formed with a hook 114 at the end of the stem section 112 to which the axle assembly of the rear wheel is attached. The right-sided dropout may be formed with other openings, or even a cable guide, features not illustrated, to facilitate mounting the rear derailleur and the positioning of the associated shifter cable.

Figure 6:
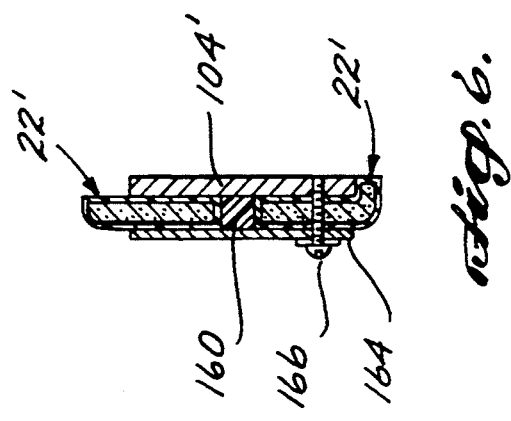
FIG. 6 is a partial vertical section along line 6—6 of FIG. 5.
Figure 5:
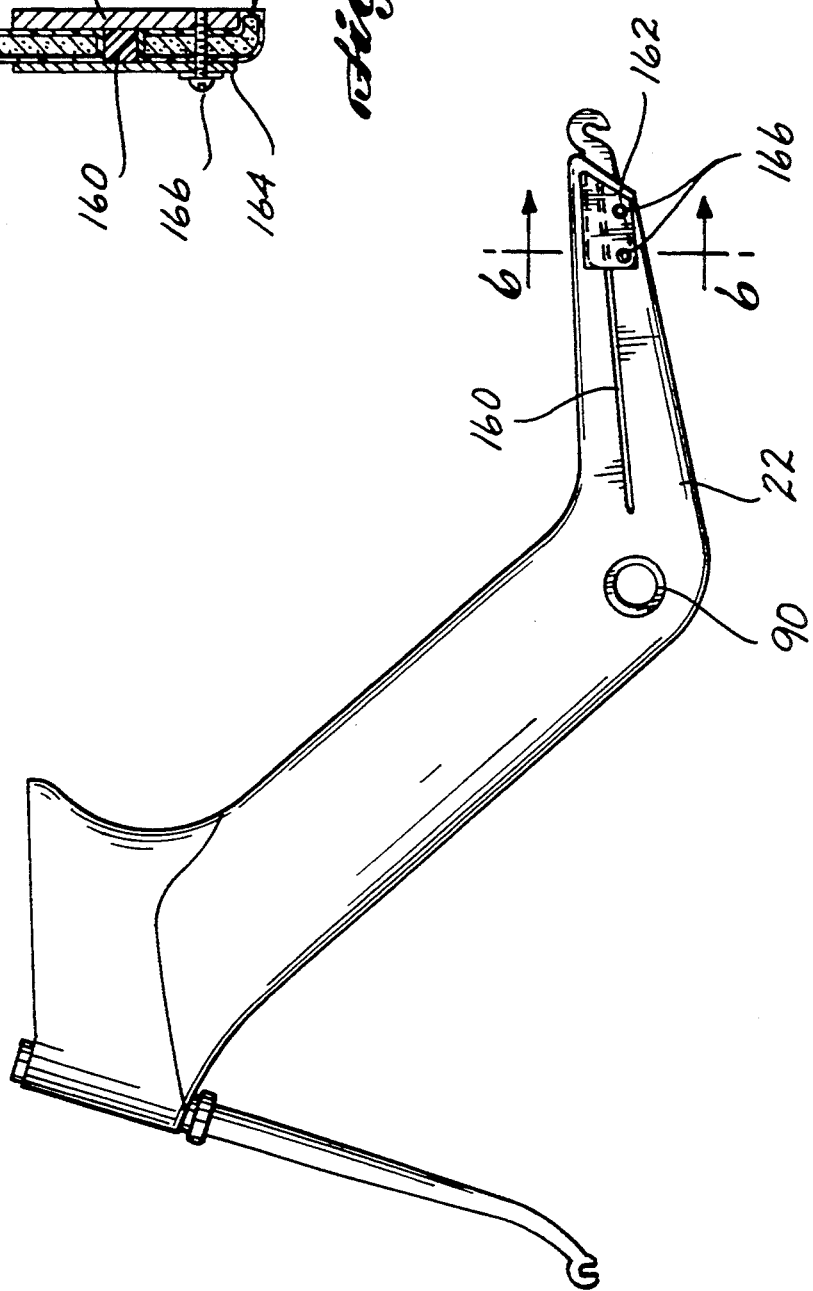
FIG. 5 is a side elevation of a modified frame in accordance with the present invention.

In the modification illustrated in FIGS. 5 and 6, each modified chain stay 22' is formed with a generally horizontally extending elongated through slot 160 starting at a location closely adjacent the crank bore 90 and extending all the way to the trailing edge 162 of the chain stay. Such slot bifurcates the stay 22' into top and bottom sections of approximately equal height. Preferably, the slot is filled with elastomeric material such as a resilient urethane. As best seen in FIG. 14, each dropout 104' also is modified such that its body or base portion extends from a location substantially below the slot 160 to a location substantially above the slot. On the exterior side of each stay 22', a guide plate 164 extends from a location below the slot 160 to a location a substantial distance above the slot. The guide plate 164 and associated dropout 104' are secured to the bottom bifurcation of the stay 22' such as by a pair of pin fasteners 166. The top bifurcation of the stay is not connected to the dropout 104' or the guide plate 160. Consequently, the top bifurcation of the chain stay is supported laterally such that it remains registered with the bottom bifurcation of the stay, but the top bifurcation is resiliently supported for shock absorbing movement toward and away from the bottom bifurcation of the stay. This provides some additional flexibility in the area of the bicycle crank for a smoother ride as the weight of the cyclist is applied to the pedals abruptly, particularly when the bicycle is ridden over uneven terrain.

The front derailleur and rear brake assembly 30, as represented by FIGS. 7–10 has a metal mount 116 that is secured between body units 36 and 38. Mount 116 is formed of a single piece and has a flat base section 118 that rests on and bridges the interface between the body units 36 and 38. A locking fin 120 extending downward from the base section stabilizes and holds the mount in position. The locking fin 120 is slightly offset from the longitudinal center axis of the base section 118 and is seated in a recess 122 formed in the right body unit 38. A top fin 124 extends upward from the base section 118. An arm 126 that is centered on the centerline of the bicycle 10 extends rearward from the top fin 124 and has a cross-sectional width slightly greater than that of the fin. A side-pull type brake 128 is mounted to the arm 126 to function as the rear brake of the bicycle. Brake 128 is secured to the arm 126 by a fastener 130 that extends through the arm 126 and the individual arms of the brake 128. Owing to the positioning of the mount 116 and the arm 126, brake 128 lies in a horizontal plane.

A front derailleur 134 is attached to the mount 116 by an adjustably positionable bracket 136. Bracket 136 has a first faceplate 138 that is disposed against the top fin 124 of the mount 116. Plate 138 is secured to the mount 116 by first and second fasteners 140 and 142, respectively. First fastener 140 extends through a circular bore 144 formed in the top of the top fin 124 and second fastener 142 extends through a slotted, arcuate opening 146 formed below bore 144. Bracket 136 includes a second faceplate 146 that extends perpendicularly away from the first faceplate 138 and that is located slightly above the first faceplate. The front derailleur 134 is mounted to the second faceplate 146 of the bracket 136. The front derailleur 134 includes a base unit 148 that is actually attached to the second faceplate 146 and a chain guide/shifter arm assembly 145 that is pivotally mounted to the base unit. A projection 143 of the derailleur base unit 148 connects to the upright faceplate 146 by a fastener (not shown) that extends through an elongated slot 149 formed in faceplate 146.

Figure 11:
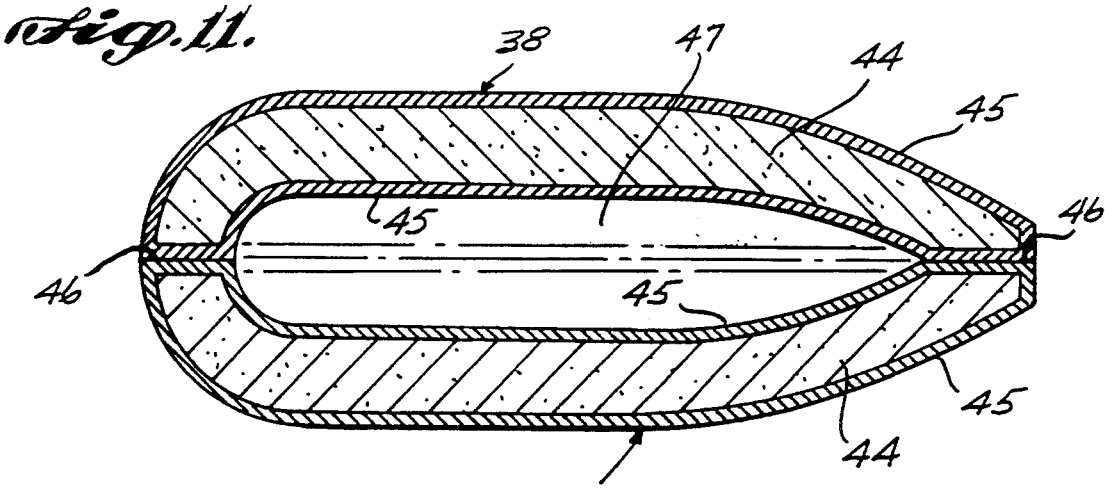
FIG. 11 is a section along cutting plane 11 indicated in FIG. 1.
Figure 12:
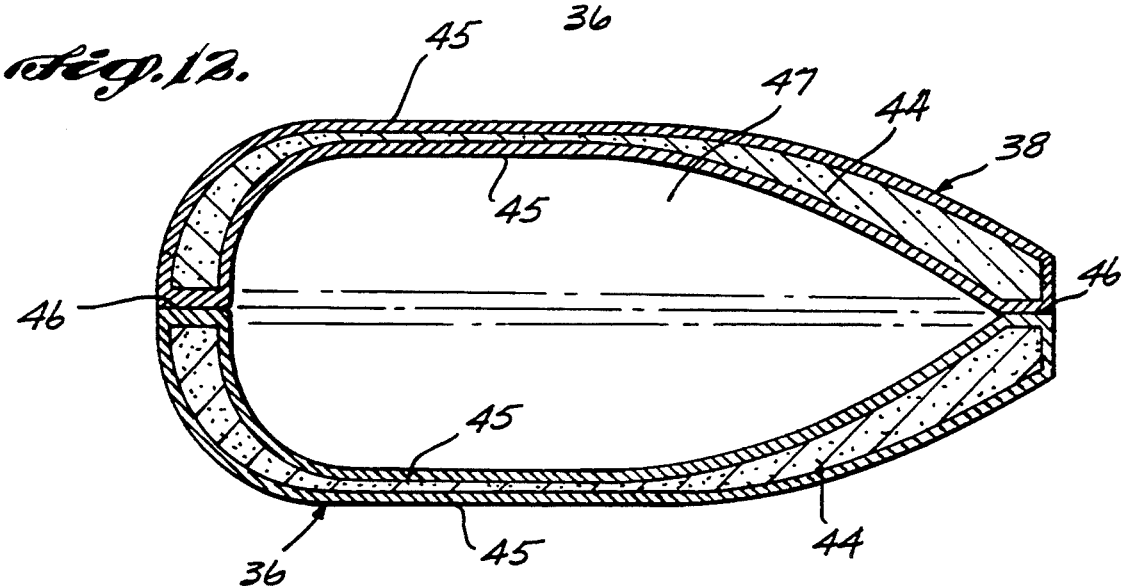
FIG. 12 is a section along cutting plane 12 indicated in FIG. 1.

With reference to FIG. 2, after the head unit 34 and body units 36 and 38 are fabricated, assembly of the bicycle proceeds with the mating of the body units. The fight and left body units 36 and 38 are mirror images of each other. As best seen in FIGS. 11 and 12, preferably both body units are of generally C-shape in cross section with a foam core 44 encapsulated in a thinner outer skin 45. The facing surfaces 46 are planar at the leading and trailing edge portions of the body units for substantial contiguous engagement along the central vertical plane of the bicycle frame, leaving a substantial center void or cavity 47. Epoxy or other suitable adhesive is used to join the edge portions 46 to secure the body units together. Such joining edge portions form ribs along the leading and trailing edges of the inclined central portion of the frame.

Figure 13:
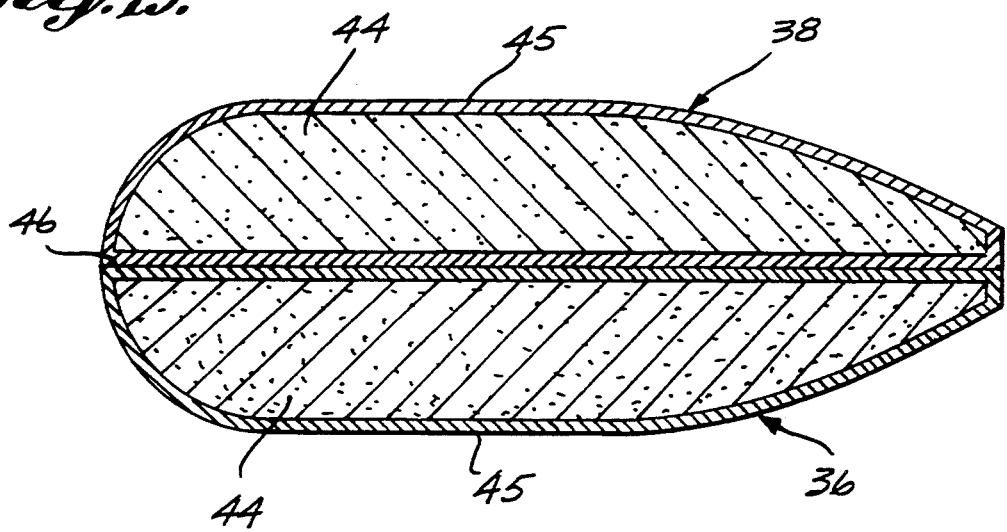
FIG. 13 is a section along cutting plane 13 indicated in FIG. 1.

The size of the central cavity 47 can vary along the length of the body portion of the frame. For example, as seen in FIG. 12 the walls of each body section 36 and 38 can taper in thickness from the upper portion of the body section toward the center of the body section such that the walls are substantially thinner at the center and the cavity 47 constitutes a greater portion of the enclosed area. From the central portion of the body section downward, preferably the walls increase in thickness to the area where the crank is mounted. As seen in FIG. 13, at such area the body units are of back-to-back D cross section with the facing surfaces 46 coplanar and contiguously engaged from their leading edges all the way to their trailing edges. While the frame having a hollowed out central and upper portion is preferred, the entire frame can have body units of D cross section meeting at the central vertical plane of the bicycle, as indicated in broken lines in FIGS. 11 and 12, for greater strength, but at the expense of greater weight.

With reference to FIG. 14, the top of each body unit 36 and 38 is formed with an upward facing shoulder 49. The top margin of each body unit has a peripheral flange 53 formed by a double thickness of the skin 45 and defining an upward opening socket. The head unit 34 of the frame is formed with a downward projecting tongue 54 for close fitting in the socket formed by the peripheral flanges 45 and of a length sufficient to engage against the upward facing shoulders 49. Epoxy or other suitable adhesive applied to the adjacent skins of the head unit 34 and the body units 36 and 38 secures the units together to form the composite bicycle frame.

Once the composite frame is assembled, the various bores are drilled through the frame so that the requisite sleeves may be positioned therein. Once the sleeves are attached to the frame 12, the remainder of the components are coupled to the frame to complete the assembly of the bicycle 10.

Figure 15:
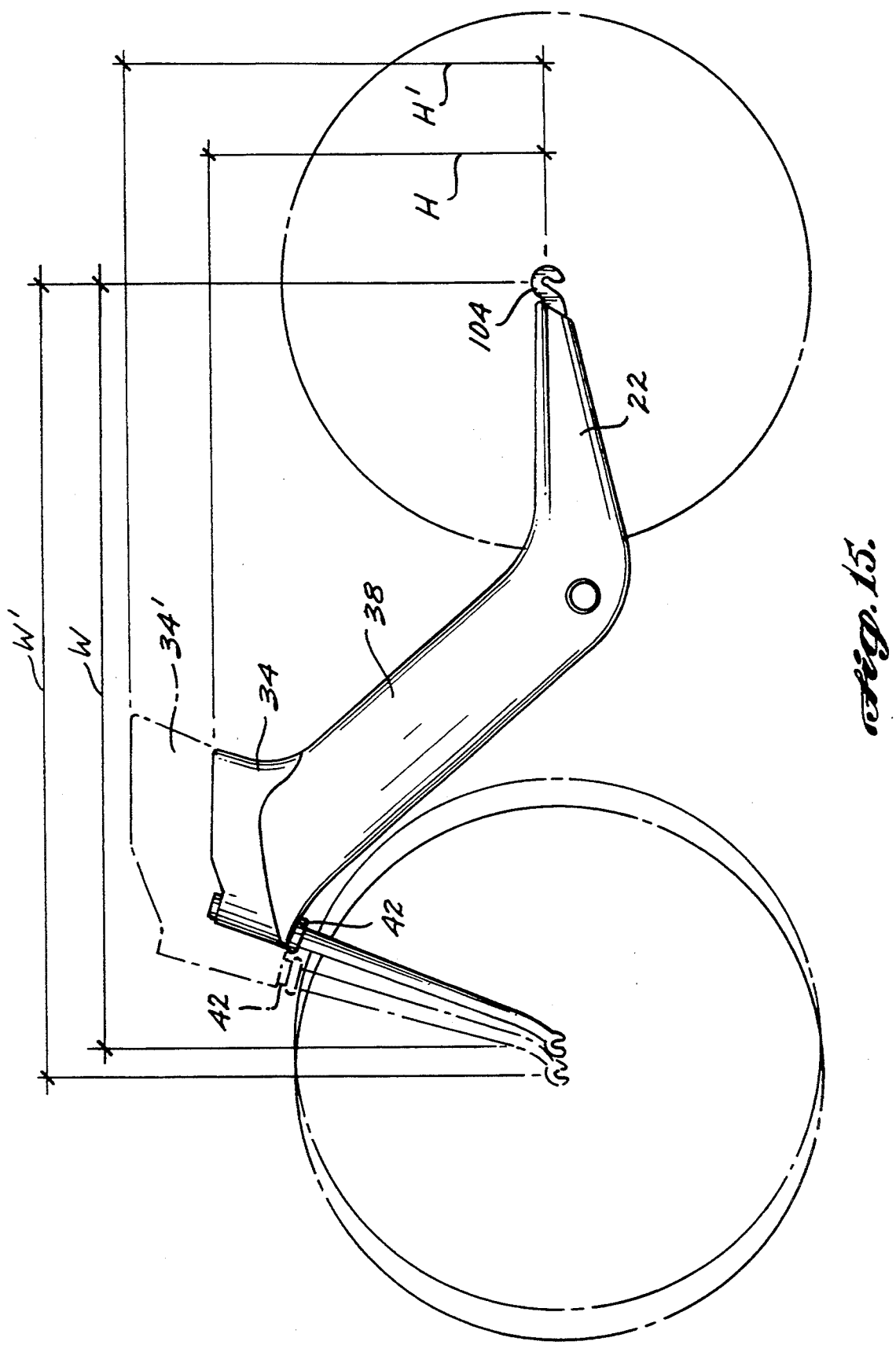
FIG. 15 is a somewhat diagrammatic side elevation of components of a bicycle having a frame in accordance with the present invention illustrating the change in geometry by use of different standardized modules.

The size and geometry of the bicycle frame can be changed by using body units or head units of different size but with identical interfitting components (i.e., tongues and sockets). FIG. 15 illustrates a representative change in geometry by using identical body units (the left unit 36 is visible) with different head units 34 and 34'. The tongues of the head units 34 and 34' are identical so that they will mate securely with the standardized body units. In a representative embodiment the height H, H' from the center of the rear wheel to the top of the head unit can vary between about 41 centimeters and about 52 centimeters by selecting an appropriately sized head unit module. Also, the modules can have different angles for the head tubes 42 resulting in a change in the wheel base W, W' such as from about 95 centimeters to about 99 centimeters. Also, dropouts 104 of different sizes can be secured to the chain stays 22 to accommodate wheels of different sizes. All of these variations in geometry are possible by substituting different sets of modular components in order to dimension the bicycle frame according to the stature of the cyclist.

Figure 7:
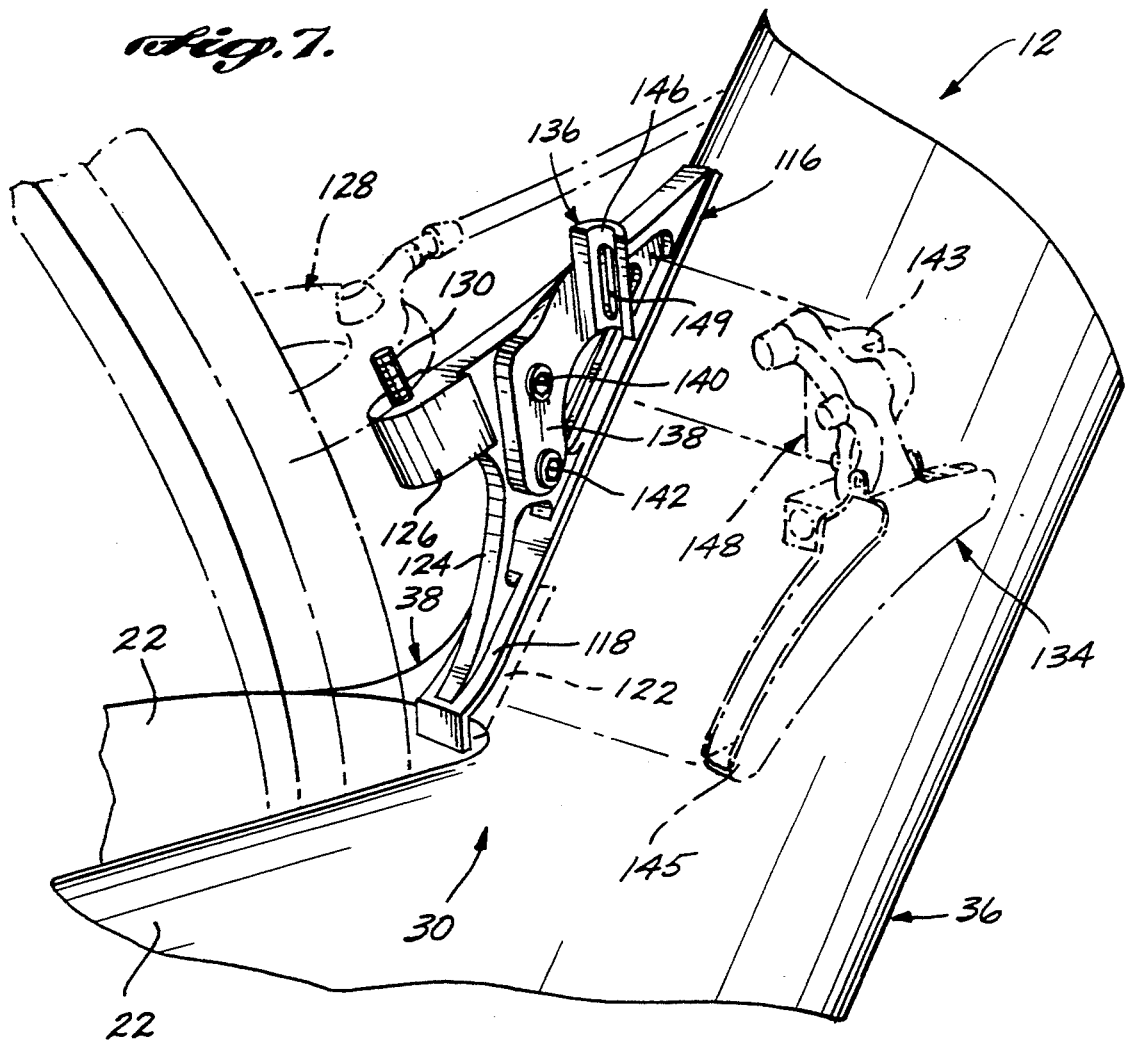
FIG. 7 is a perspective view of the front derailleur and brake assembly used with the frame of this invention, with parts broken away and parts shown in phantom.
Figure 8:
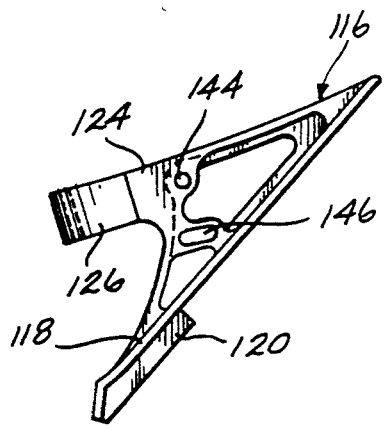
FIG. 8 is a side view of the front derailleur and rear brake assembly mount of FIG. 7.
Figure 9:
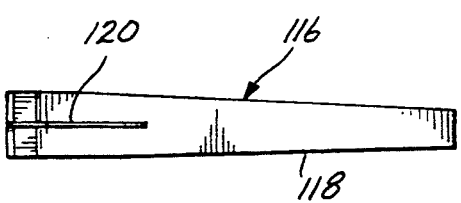
FIG. 9 is a bottom view of the front derailleur and rear brake assembly mount of FIG. 7.
Figure 10:
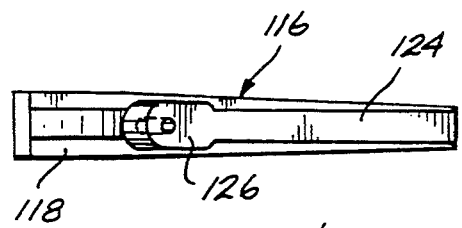
FIG. 10 is a top view of the front derailleur and rear brake assembly mount of FIG. 7.

With reference to FIG. 7, the design of the front derailleur and rear brake assembly 30 further enhances the ability to attach components of different sizes to the bicycle frame. Bracket 136 can be secured to mount 116 so that the front derailleur 134 has a selected angular orientation relative to vertical. The front derailleur 134 can be selectively secured to bracket 136 so that the derailleur is a selected vertical distance from the crank assembly. This adjustability makes it possible to install a single front derailleur and rear brake assembly 30 on the frame 12 that can be used to set the positions of the chains associated with differently sized drive trains. Thus, owing to the adjustability of the front derailleur and rear brake assembly 30 and the ability to install differently sized dropouts 104 to the chain stays 22, it is possible to construct frames 12 of this invention that can be configured to be used with differently sized bicycle wheels. For example, it is contemplated that a single bicycle frame 12 can be constructed to be used with wheels that are 26 inches, 27 inches, or 670 mm in diameter.

Still another advantage of the bicycle 10 of this invention is that the center rib or ribs formed when the body units 36 and 38 mate significantly increases the structural rigidity of a bicycle without significantly increasing its overall weight. Thus, the bicycle frame 12 of this invention has an overall weight of less than four pounds and yet is structurally as strong as tubular frames weighing significantly more. Furthermore, since this bicycle does not have the top tubes and seat posts that are associated with conventional bicycles, it is believed to offer less wind resistance than bicycles of earlier designs. The relatively long profiles of the center portions 39 of the body units 36 and 38 provide surfaces upon which advertising can readily be placed without depreciating the overall aerodynamic efficiency of the bicycle.

It will be understood that the foregoing description is for the purposes of illustration only. It will be readily recognized that bicycle 10 of this invention can be constructed out of alternative components and alternative materials other than those that have been described by way of example above. For example, in some preferred versions of the invention, instead of having two body units, it may be desirable to have a single body unit with which both chain stays are integral and in which the head unit is seated. In still other versions of the invention it may be desirable to construct the bicycle so the body units are seated in the head unit. Furthermore, it should be understood that other features and accessories can be added or removed from the bicycle. For example, it may be desirable to add a cage for a water bottle or a bracket for holding a pump. Alternatively, there may be versions of the invention for which it would be desirable to eliminate the bores in which the derailleur cables and brake cable are mounted and, instead, attach those components to the cable housings that are located outside of the frame 12. It should similarly be recognized that other seat supports may be used to provide structural linkage between the bicycle seat 28 and the frame 12. Therefore, it is an object of the appended claims to cover all such modifications and variations that come within the true spirit and scope of the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A bicycle comprising:
   a frame formed of composite material, said frame including a separately formed head unit and at least one separately formed body unit secured to said head unit, said body unit having a center portion coupled to said head unit and two spaced-apart chain stays extending rearward from said center portion;
   a seat assembly including a seat support beam attached to said head unit, said seat support beam extending rearward from said head unit, and a seat attached to a portion of said seat support beam distal from said head unit;
   a front wheel assembly including a front fork assembly rotatably coupled to said head unit, a front wheel attached to said front fork assembly below said head unit, and a handlebar assembly attached to said front fork assembly above said head unit;
   a rear wheel rotatably coupled to said chain stays; and
   a drive train assembly including a free gear secured to said rear wheel, a crank assembly secured to said center portion of said frame, and a drive chain connecting said crank assembly to said free gear.

2. The bicycle of claim 1, wherein said body unit of said frame has a top section that defines an upward opening socket and said head unit of said frame includes a portion seated in said socket.

3. The bicycle of claim 1, wherein said frame includes two symmetrically shaped body units, each said body unit having a diagonally extending center section, and each of said body units also forming a separate one of said chain stays, said body units being joined together along at least a portion of their center sections.

4. The bicycle of claim 3, wherein each chain stay is elongated and has a generally horizontally extending longitudinal slot dividing the stay into top and bottom bifurcations, and including a strip of resilient material received in each of said slots.

5. The bicycle of claim 3, wherein said body units have top sections that define an upward opening socket and said head unit is seated in said socket.

6. The bicycle of claim 3, wherein said head unit and said body units of said frame are each formed with a foam core and skin formed from rigid, nonmetallic material, and said body units are mated so that said skins of said body units join each other and form at least one rib extending longitudinally through at least a part of said frame.

7. The bicycle of claim 3, wherein said body units and head unit have interfitting portions joined together.

8. The bicycle assembly of claim 7, further including a head tube extending longitudinally through said head unit and wherein said front fork assembly is disposed in said head tube.

9. The bicycle assembly of claim 7, further including a bottom bracket assembly including a sleeve extending longitudinally through said body units, wherein said crank assembly is rotatably mounted to said bottom bracket assembly.

10. The bicycle assembly of claim 3, further including two dropouts for securing said rear wheel to said chain stays, said dropouts being releasably secured in recesses formed in said chain stays.

11. The bicycle assembly of claim 3, further including a front derailleur and rear brake assembly attached to the top side of said body units adjacent said crank assembly and said chain stays, said front derailleur and rear brake assembly including a front derailleur having a chain guide disposed around said drive chain and a brake disposed around said rear wheel.

12. The bicycle assembly of claim 11, wherein said front derailleur and rear brake assembly includes a mount secured to said body units, said mount comprising a base section attached to the top of at least one of said body units adjacent said chain stays; and an upward projection attached to said base section, said upward projection being coupled to said front derailleur, said upward projection also being coupled to said rear brake adjacent said front derailleur.

13. The bicycle assembly of claim 3, further including at least one derailleur attached to said frame to change the position of said drive chain, a shifter attached to said head unit, and a shifter cable extending from said shifter to said derailleur for controlling the position of said derailleur in response to movement of said shifter and one of said body units is formed with a bore and said derailleur cable is partially disposed in said bore.

14. The bicycle assembly of claim 3, further including at least one mounting assembly for securing said seat support to said head unit of said frame, said mounting assembly for said seat support being at least partially disposed under said skin of said head unit.

15. A bicycle frame formed of composite material comprising a head unit and two separately formed body units secured to said head unit, said body units each having a center section coupled to said head unit and two spaced-apart chain stays extending rearward from said center sections, and wherein said head unit and said body units each comprise a core member that is at least partially encased in a rigid, nonmetallic skin and said body units are mated together with at least a portion of said skin of one body unit adjacent at least a portion of said skin of the other body unit so that the adjacent skins of said body units form a rib that extends longitudinally through at least a part of said frame.

16. The bicycle frame of claim 15, wherein:
    said body units have top sections that define a first connection component; and said head unit has a bottom section that defines a second connection component interfitted with said first connection component.

17. The bicycle frame of claim 15, further including a head tube disposed in said head unit said head tube being dimensioned to receive a front fork assembly.

18. The bicycle frame of claim 15, further including a bottom bracket assembly including a sleeve extending longitudinally through said body units, said sleeve being dimensioned to receive a crank assembly.

19. The bicycle frame of claim 15, further including recesses formed in the ends of said chain stays and two dropouts for securing a rear wheel to said chain stays, said dropouts being releasably secured to said frame in said recesses formed in said chain stays.

20. The bicycle frame assembly of claim 15, wherein said center section of at least one said body unit is formed with a bore dimensioned to accommodate a cable.

21. The bicycle frame of claim 15, further including at least one mounting assembly for securing a seat support to said head unit of said frame, said mounting assembly for said seat support being at least partially disposed under said skin of said head unit.

22. A bicycle comprising:
a frame formed of composite material, said frame including a separately formed head unit and two separately formed body units coupled to said head unit, wherein the size of said head unit determines the frame size of the bicycle said body units including center sections, having forward ends and rearward ends, said center sections being joined together, and a pair of rearwardly extending chain stays, one of said chain stays extending from the rearward end of each center section;
a seat assembly including a seat support beam attached to said head unit, said seat support beam extending rearward from said head unit, and a seat attached to a portion of said seat support beam distal from said head unit;
a front wheel assembly including a front fork assembly rotatably coupled to said head unit, a front wheel attached to said front fork assembly below said head unit, and a handlebar assembly attached to said front fork assembly above said head unit;
a rear wheel rotatably coupled to said chain stays; and
a drive train coupled to said frame and connected to said rear wheel for rotating said wheel.

23. The bicycle of claim 22, wherein each chain stay is elongated and includes a generally horizontally extending longitudinal slot top and bottom bifurcations above and below said slot, respectively, and a strip of resilient material received in said slot.

24. A bicycle frame for securing a seat assembly, a front fork and wheel assembly, a rear wheel, and a crank assembly, said bicycle frame comprising:
(a) a head unit configured for securing the front fork and wheel assembly;
(b) a bottom body unit extending rearwardly and downwardly from said head unit, said body unit including a bottom bracket bore for securing said crank assembly; and
(c) at least one chain stay extending rearwardly from said body unit, said chain stay being elongated and having a slot dividing said chain stay into top and bottom bifurcations, and including a strip of resilient material received in said slot.

25. The bicycle frame of claim 24, comprising a dropout affixed to the bottom biercation of said chain stay for securing the rear wheel.

26. The bicycle frame of claim 25, wherein said slot extends generally longitudinally and horizontally.

27. The bicycle frame of claim 25, wherein said dropout includes a first plate disposed on one side of said chain stay and a second plate disposed on the opposite side of said chain stay, said first and second plates being affixed to said bottom bifurcation and slidably engaging said top bifurcation such that said top bifurcation is allowed to move relative to said bottom bifurcation.

* * * * *

UNITED STATES PATENT AND TRADEMARK OFFICE
CERTIFICATE OF CORRECTION

PATENT NO. : 5,415,423  
DATED : May 16, 1995  
INVENTOR(S) : J.D. Allsop et al.

Page 1 of 2

It is certified that error appears in the above-indentified patent and that said Letters Patent is hereby corrected as shown below:

| COLUMN | LINE | | |
|---|---|---|---|
| title page [56] | Refs. Cited U.S. Pat Docs | Insert --3,079,173 2/1963 Hedstrom-- |
| title page [56] | Refs. Cited For. Pat Docs | Insert --872322 3/1953 Germany-- |
| title page [56] | Refs. Cited For. Pat Docs | Insert --2021054 11/1979 United Kingdom-- |
| title page [56] | Refs. Cited For. Pat Docs | Insert --0399075 11/1990 European-- |
| title page [56] | Refs. Cited For. Pat Docs | Insert --4101998A1 7/1992 Germany-- |
| 1 | 50 | "an&or" should read --and/or-- |
| 3 | 51 | "pan" should read --part-- |
| 4 | 3 | "fight" should read --right-- |
| 4 | 49 | "ranged" should read --flanged-- |

UNITED STATES PATENT AND TRADEMARK OFFICE
CERTIFICATE OF CORRECTION

PATENT NO. : 5,415,423
DATED : May 16, 1995
INVENTOR(S) : J.D. Allsop et al.

Page 2 of 2

It is certified that error appears in the above-indentified patent and that said Letters Patent is hereby corrected as shown below:

| COLUMN | LINE | ERROR |
|---|---|---|
| 5 | 53 | "tings" should read --rings-- |
| 6 | 33 | "registered" should read --in register-- |
| 6 | 35 | "shock absorbing" should read --shock-absorbing-- |
| 7 | 16 | "fight" should read --right-- |
| 10 (Claim 17, | 67 line 2) | "unit said" should read --unit, said-- |
| 11 (Claim 22, | 24 line 6) | "bicycle said" should read --bicycle, said-- |
| 12 (Claim 23, | 24 line 3) | "slot top" should read --slot, top-- |
| 12 (Claim 25 | 24 line 2) | "biercation" should read --bifurcation-- |

Signed and Sealed this

Fifth Day of September, 1995

Attest:

BRUCE LEHMAN

Attesting Officer    Commissioner of Patents and Trademarks